United States Patent [19]

Tulley

[11] Patent Number: 4,846,529
[45] Date of Patent: Jul. 11, 1989

[54] SWIVEL SEAT

[76] Inventor: Jack M. Tulley, 6608 Reefton, Cypress, Calif. 90630

[21] Appl. No.: 178,908

[22] Filed: Apr. 7, 1988

[51] Int. Cl.⁴ .............................................. B60N 1/02
[52] U.S. Cl. ................................... 297/349; 297/330; 297/DIG. 10
[58] Field of Search ............... 297/349, 350, DIG. 10; 248/393, 394, 396, 425

[56] References Cited

U.S. PATENT DOCUMENTS

| | | | |
|---|---|---|---|
| 1,682,989 | 9/1928 | Smelker | 248/425 |
| 2,240,143 | 4/1941 | Lustig | 248/394 |
| 2,809,690 | 10/1957 | Walther et al. | 248/393 |
| 3,081,973 | 3/1963 | Arlauskas et al. | 248/393 |
| 3,236,556 | 2/1966 | Lathers | 297/349 |
| 3,712,573 | 1/1973 | Pickles | 248/394 |
| 4,241,893 | 12/1980 | Koutsky et al. | 248/425 |
| 4,351,562 | 9/1982 | Twitchell et al. | 297/349 |
| 4,600,239 | 7/1986 | Gerstein et al. | 297/349 |

Primary Examiner—Francis K. Zugel
Attorney, Agent, or Firm—G. Donald Weber, Jr.

[57] ABSTRACT

A seat which is used as a passenger seat in a vehicle and which is adapted to assist passengers, particularly elderly and/or handicapped persons, in entering or leaving the vehicle. The seat includes a motorized control which permits the seat to be moved forward or backward, up or down, and to rotate on its vertical axis approximately 90°, as well, to tilt from back to front. The seat can be adjusted to fit the requirements of the person, and selectively rotate until the seat faces the door of the vehicle, extend outwardly toward the door opening, and then, tilt to assist the person in being seated or unseated. The swivel seat uses substantially the same space as is currently required for conventional adjustable seats in a vehicle.

1 Claim, 3 Drawing Sheets

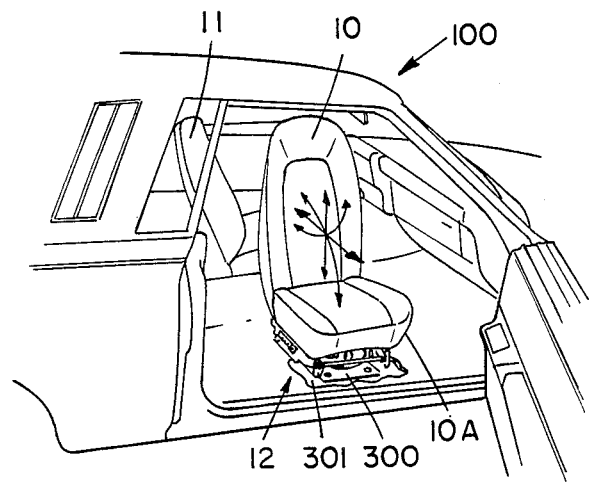
FIG. 1
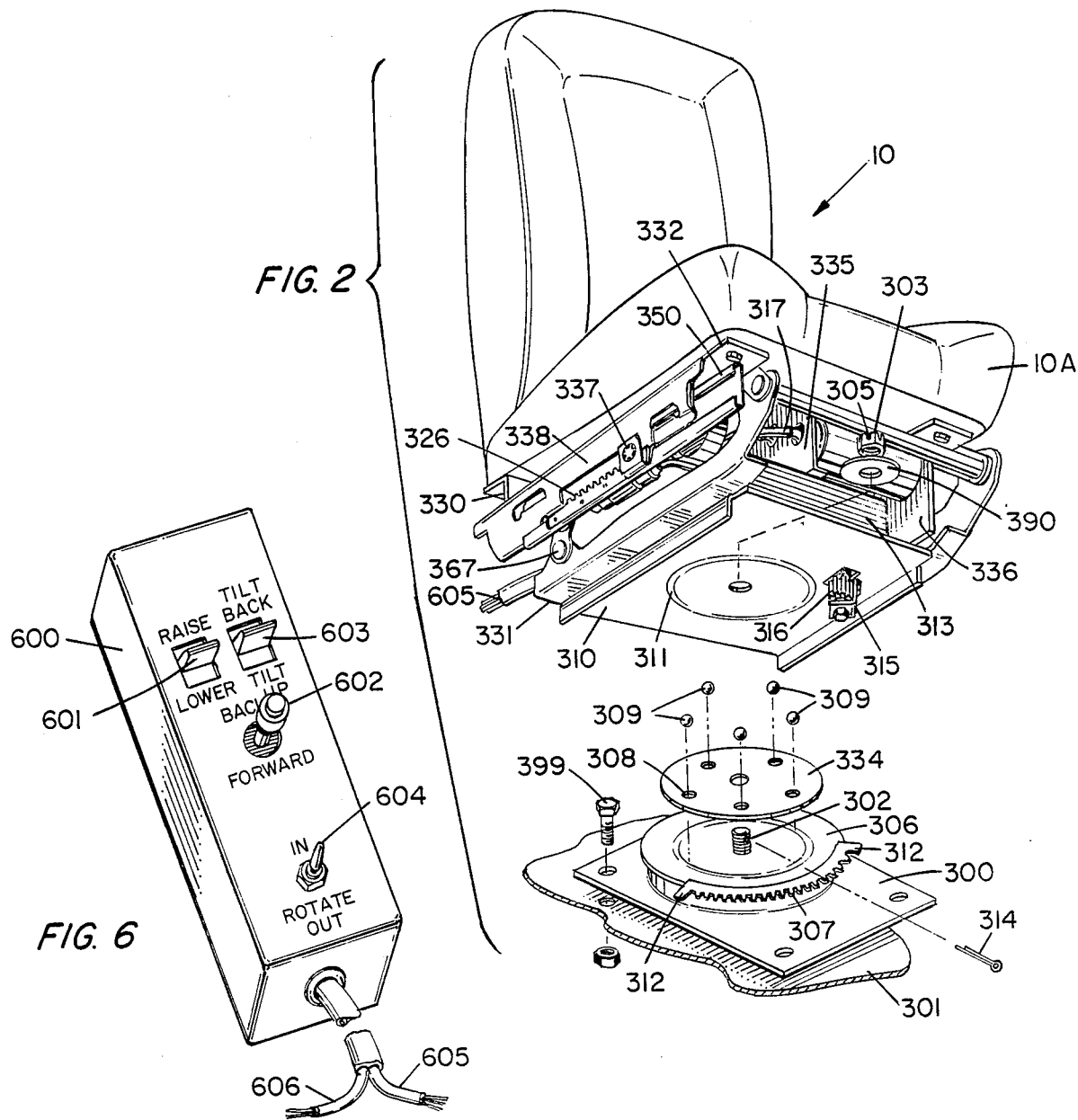
FIG. 2
FIG. 6

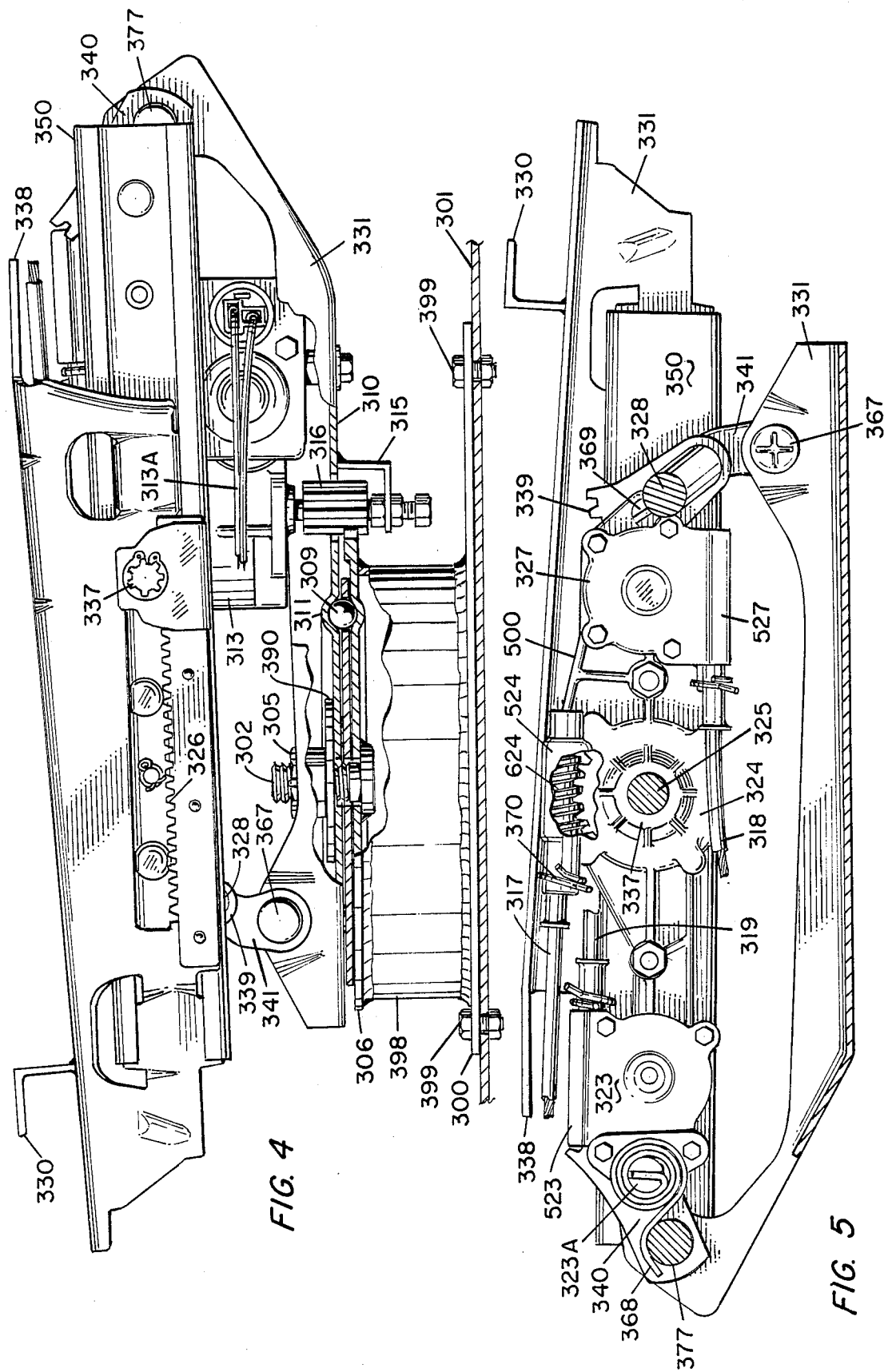

SWIVEL SEAT

BACKGROUND

1. Field of the Invention

This invention is directed to a rotatable, tiltable and movable seat, in general, and to such movable seats which are used in close quarters, for example, in vehicles or the like, in particular.

2. Prior Art

It is well known to those experienced in designing and manufacturing various seating apparatus such as those used in vehicles and so forth, that considerable difficulty can be experienced by persons when entering or leaving a vehicle. This difficulty can be produced in so-called ordinary conditions because of the tendency of a person's clothes to "stick" to the seat and prevent the sliding movement necessary for getting in or out of the seat. This problem is exascerbated when the seat is disposed in a relatively small space or close quarters. A typical problem is encountered in the driver's or operator's seat of a vehicle wherein the steering apparatus of a vehicle can be in the way.

While the problem is most often encountered in automobiles, it is also a problem in airplanes, boats or other environments with limited space.

In addition, there is a significant difference in the height, leg length and body proportions of various persons. These differences can be a problem in entering or operating a vehicle such as an automobile. In similar fashion, the tendency for current design criterion is to produce cars with lower profiles and, consequently, lower seats. With these lower seats, entering and leaving the vehicle is inconvenient, annoying and, frequently, difficult.

Also, the problem can be exaggerated in the case of a handicapped or disabled person who needs additional room, leverage, or the like in embarking or disembarking from a seat in a vehicle.

It is known in the art to provide seats which produce a seat support assembly. These seats usually have a floor engaging apparatus or assembly. Moreover, the seats known in the art tend to move backward and forward as a minimum and upwardly and downwardly in more advanced embodiments. In addition, it is known in the art to have the seats controlled by motors so that the raising and lowering, as well as the movement back and forth, can be controlled easily and readily by the operator.

In addition, there are seats which are known to swivel about an axis thereof. However, most of the seats which are known in the prior art are relatively bulky and difficult to operate. Few, if any of the seats known in the prior art combine all of the features of up/down, back/forth, rotation and tilting of a seat thereby to assist a person, in particular an infirm or disabled person, while using the seat.

PRIOR ART STATEMENT

The following references have been uncovered during a patentability search relative to the instant invention. These references are listed in patent number order, where appropriate. No significance is placed on the ordering of the patents.

U.S. Pat. No. 2,576,004; SEMI REVOLVING VEHICLE SEAT; G. T. Fair. This patent is directed to a seat which has a bottom portion which is rotatable through 90°. The back of the seat does not rotate. The seat is not adjustable up or down nor is it a tilting seat. In addition, it is mechanically operable.

U.S. Pat. No. 2,930,428; POWER ADJUSTABLE SEAT MOUNT; J. P. DeRose. This patent is directed to an adjustable seat which is power operated for front-/back movement. This seat does not rotate or tilt.

U.S. Pat. No. 3,046,052; REVOLVABLE SEAT; R. E. Summers. This patent is directed to a manually operable seat with a fixed back and a movable seat cushion only. The seat moves only in a rotational fashion and it does not move up/down or back/forth.

U.S. Pat. No. 3,051,525; AUTOMOBILE SEAT; J. A. Taylor. This patent is directed to a manually operated seat wherein the seat back remains fixed while the seat cushion can be rotated or moved in the up/down direction. A portion of the seat cushion can be moved separately to provide a unique configuration thereof.

U.S. Pat. No. 3,954,298; HEIGHT ADJUSTMENT MECHANISM FOR SUSPENSION SEAT; F. G. Lowe. This patent is directed to a seat having a height adjustment mechanism which provides up/down movement only. There is no rotating or tilting apparatus. This device is manually operated as well.

Braun 6-Way Power Seat Base. No patent has been discovered relative to this product. The Braun seat can rotate and move up/down. No tilting movement is described. Also, it will not extend outwardly from its mounting to assist a passenger in getting in or out of the vehicle.

SUMMARY OF THE INVENTION

A seat which is used in a vehicle and is adapted to assist persons in using the seat and, especially upon entering or leaving the vehicle. The seat includes a motorized control which permits the seat to be moved forward or backward, up or down, and, as well, to tilt from back to front. In addition, the swivel seat rotates on a vertical axis through an arc of approximately 90°. The seat uses substantially the same space as is currently required for adjustable seats in vehicles.

BRIEF DESCRIPTION OF THE DRAWINGS

FIG. 1 is a schematic representation of a vehicle with the seat of the instant invention incorporated therein.

FIG. 2 is an exploded view of the seat moving apparatus of the instant invention.

FIG. 4 is a side view of the seat moving apparatus taken along the lines 4—4 in FIG. 3.

FIG. 5 is a sectional view of the seat moving apparatus taken along the lines 5—5 in FIG. 3.

FIG. 6 is a schematic view of the control panel associated with the seat moving apparatus of the instant invention.

DESCRIPTION OF A PREFERRED EMBODIMENT

Figure 3:
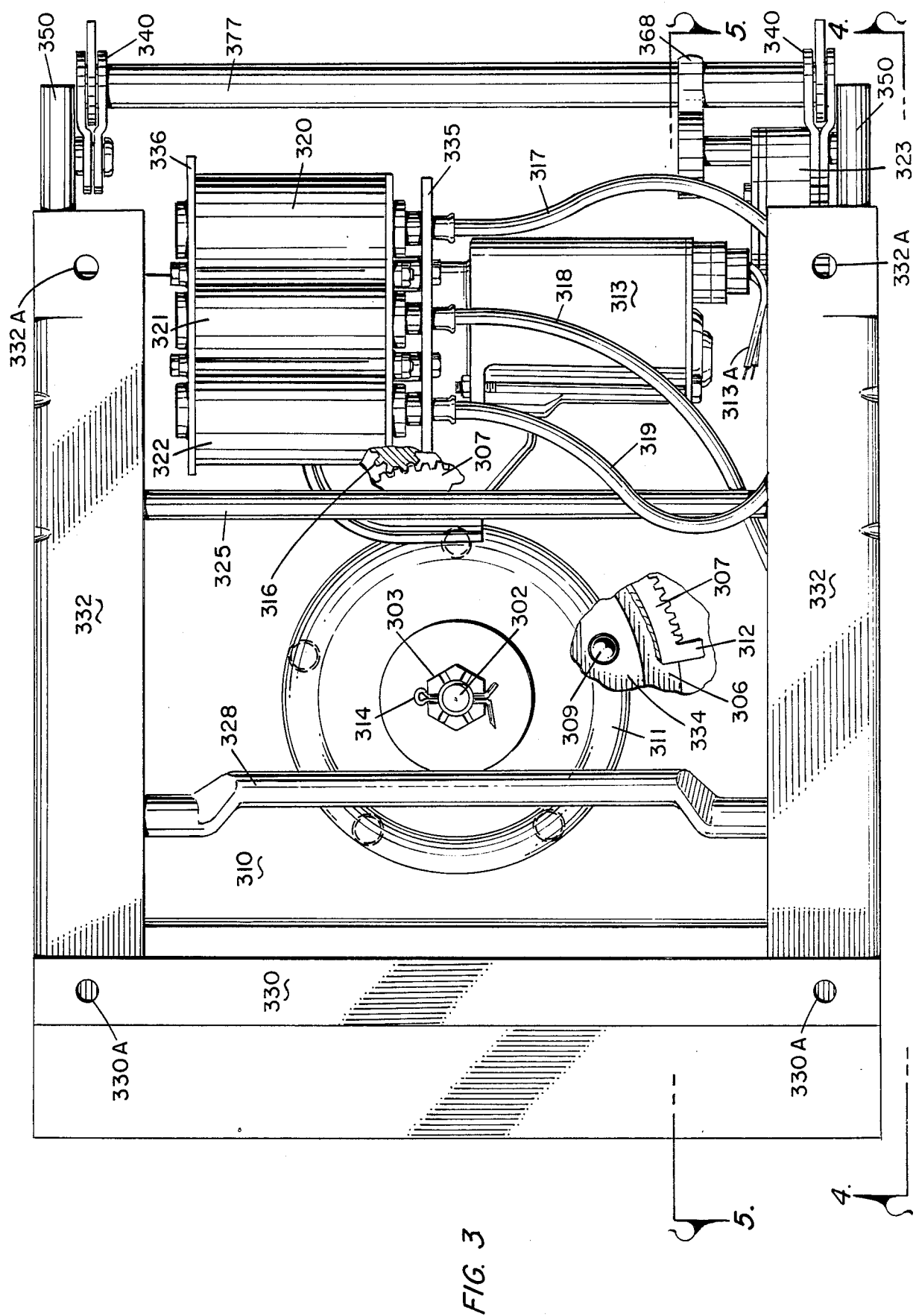
FIG. 3 is a top view of the apparatus for moving the seat.

Referring now to FIG. 1, there is shown a schematic representations of a portion of a vehicle 100 which, in fact, is to be considered as representative of any vehicle such as an automobile, a truck, a boat, an airplane or the like. A seat 10 is shown mounted in the vehicle 100. In the embodiment shown, seat 10 comprises a seat on the passenger side of a left-hand-drive vehicle as is conventional in the United States. Also, seat 11 represents the seat on the driver's side of the vehicle. It is to be understood that, in this description, the seats 10 or 11 are interchangable and the same apparatus for controlling the position of the seats can be utilized on either or both of these seats as may be desirable.

As suggested by the arrows in FIG. 1, the movable seat 10 can move up or down as a unit whereby a horizontal plane is maintained. Likewise, the seat can move forward or backward. The forward movement of the seat is adapted to provide an extension thereof outside of the confines of the vehicle after the seat has been rotated outwardly (as shown in FIG. 1). This extension operates to assist a passenger in the process of sitting upon or arising from the seat.

It is clear from the illustration in FIG. 1 that the seat can rotate approximately 90° from the forward looking position to the side looking position. Of course, a 90° swivel or rotation is considered optimum but is not considered limitative of the invention.

Furthermore, the seat 10 can also tilt about an axis defined at the front or the rear portion of the horizontal seat component or portion 10A of the seat. That is, the back of the seat is, effectively, raised relative to the front of the seat (or vice versa). The tilting actions can provide comfort to the seated person. The front tilting action will also assist a person in sitting upon or arising from the seat.

It is understood that all of these motions are controlled by an electromechanical apparatus 12 which is positioned beneath the horizontal portion 10A of seat 10. The control mechanism 12 includes appropriate support structure, gear apparatus, electric motors for driving the gear apparatus, and a control device which selectively activates the motors, as will be described hereinafter.

Referring now to FIG. 2, there is shown an exploded view of the rotational or swivel part of the electromechanical seat mechanism 12. In particular, there is shown a base 300 which is adapted to be bolted to the frame 301 of the vehicle 100 (see FIG. 1). The base 300 can be fabricated in such a way as to complement the contours of floor of the vehicle, if necessary, whereby the seat 10 (especially seat bottom portion 10A) remains substantially horizontal. The base 300 includes a central axial member 302 which, in the preferred embodiment, is a threaded rod or tube which is adapted to receive a nut 303 thereon to secure the apparatus as described hereinafter. In one embodiment the threaded member 302 can be a bolt welded to base 300. An aperture 304 passes axially through the rod 302 (see FIG. 3) in a preferred embodiment.

The nut 303 includes a plurality of grooves or slots 305 therein which will align with the aperture 304 through the threaded rod 302. A cotter pin 314 can be inserted through the slots 305 and aperture 304 to form a secure, locked mounting arrangement between the nut 303 and bolt 302.

A first plate-like member 306 is affixed to the base 300 by rivets, by welding or the like. In a typical arrangement, plate 306 is substantially circular in configuration. A segment or portion 307 of the perimeter of plate 306 is defined to have appropriate cogs or gear teeth. In the embodiment shown, the toothed portion 307 represents an arc of approximately 90° of the circular plate 306.

Also attached to the plate 306 are limit stops 312 which are formed at or joined to the plate 306 adjacent to the ends of the toothed portion 307. The limit stops 312 can be provided to engage limit switches (not shown) to control the amount of rotation of the seat 10, as described hereinafter. On the other hand, the limit stops 312 can function to merely curtail movement of the apparatus through a mechanical blocking arrangement.

Mounted on toothed plate 306 is a circular ball bearing retaining plate 334. Mounted in appropriate recesses or apertures in the retaining plate 334 are a plurality of ball bearings 309. In the embodiment shown, five (5) ball bearings are used. However, any appropriate and desirable plurality thereof is contemplated.

Immediately above the apparatus described above, there is shown a second plate 310 which incorporates, inter alia, a groove 311 which operates as a race for the ball bearings 309. Plate 310 is, effectively, the base of its actual seat apparatus. The threaded support rod 302 passes through an aperture in plate 310 prior to securing the nut 304. A washer 380 can be used to assist in positioning the nut/bolt arrangement relative to plate 310. With this construction, plate 310 is capable of rotating around the axial bolt 302 on the ball bearings 309.

On the upper surface of plate 310 is mounted motor 313 which is shown in a representative configuration only. Other motor designs are also contemplated within the scope of the invention.

In this embodiment, a gear mechanism is attached to the drive shaft and depends from the motor 313. The gear mechanism includes a gear 316 which meshes with the toothed portion 307 of the plate 306. Thus, when the motor 313 is activated, the gear 316 is caused to rotate. The gear 316 engages the arcuate path defined by the toothed portion 307 of plate 306. Inasmuch as plate 306 is fixed in position, gear 316 (and, thus, motor 313)) moves around the peripheru of plate 306. Motor 313 is fixed to the seat at plate 310 (see infra) whereupon the seat 10 rotates about the vertical axis defined by bolt 302.

Also depending from the gear mechanism 316 is a suitable limit device 315 which represents a limit switch, or a trigger for a limit switch, as may be desirable. The limit device 315 can operate to control and/or curtail rotational motion of the seat apparatus to a specified arc such as 90°. For example, in a single mechanical operation, limit device 315 encounters a limit stop 312 and further motion is prevented. Of course, electrical switches can be used to selectively dissable motor 313 in some embodiments.

A bottom bracket 331 is fixedly joined to the plate 310 by suitable means, for example welding. Bottom bracket 331 is joined to channel 350 by means of suitable pivotal linkages 339 and 340. A slider mechanism 328 is slidably mounted in the channel 350. The slider 328 is moved relative to the channel 350 by means of the action of rack gear 326 and roller gear 337. The slider 328 includes the angle bracket 332 to which the seat 10 is mounted at seat cushion 10A. Cable 605 extends outwardly away from the seat 10.

Referring now to FIG. 3, there is shown a top view of the seat moving apparatus 12 with the seat 10 removed. The angle iron brackets 332 (top portion of slider 338) are connected (e.g. welded) to the extender bar 330. The extender bar 330 lifts the seat 10 slightly to ensure enhanced operation of the seat. The seat is typically, mounted to the brackets 332 and extender bar 330 by passing both through the apertures 332 and 330A. The slotted nut 303 is mounted on the bolt 302 to secure plate 310 as described above.

Motors 320, 321 and 322 are mounted on suitable support means or brackets 335 and 336. These motors are connected via respective flexible drive cables 317, 318 and 319 to the appropriate gearing mechanisms to cause the seat apparatus to move forward and back, up and down or to tilt. The motor is mounted on the plate 310. The motor leads 313A are illustrated schematically, but connect to control box 600 in the actual implementation.

For example, motor 322 is connected to one end of flex cable 319. The other end of cable 319 is connected to the gear mechanism 323 (see FIG. 5) which is used to drive the front of the seat apparatus up and down through a linkage mechanism 340. The linkage mechanisms 340 on opposite sides of the apparatus are joined together by bar 377. A coil 368 bears against bar 377 to assist in supporting gear mechanism 323.

In similar fashion, motor 320 is connected to flex cable 317. Cable 319 is connected to a gear mechanism 324 which is arranged to operate in response to motor 320. The gear mechanism 324 drives roller bar 325 which is, essentially, an axis of gear mechanism 324. Roller bar includes roller gears 337 at each end thereof. As roller gears 337 rotate, they mesh with the rack gear 326 formed in slider 338. Inasmuch as gear mechanism 324 is fixed in the seat, roller gear 337 drives rack gear 326 and slider 338 thereby causing the seat 10 to be moved forward or backward depending upon the direction of rotation of gear 324.

Motor 321 is connected via flex cable 318 to a drive gear mechanism 327. This gear mechanism is connected to rear linkage 339 and, effectively, causes the rear portion of the seat to move up and down. These linkage mechanisms are joined together by bar 328. A bar 328 spans the mechanism and is joined to rear linkages 339 on opposite sides (see FIG. 5 infra). The bar 328 need not be bent as shown except possibly for purposes of a better fit in the mechanism space. The bar 328 operates, effectively, as a spacer and common axis for the rear linkages 339. The linkages 339 operate to raise and lower the rear of the seat to provide tilt operation.

Referring now to FIG. 4, there is shown a side view of the apparatus taken along the line 4—4 in FIG. 3. The base supports 300 and 301 are shown joined together by suitable bolts 399 or the like. A raised cylindrical portion 398 is used to support the plate 306. The cylinder 398 and the plate 306 can be formed together as a flanged unit or, conversely, can be separate items which are welded together or the like. The ball bearings 309 and the ball bearing race 311 are shown in cross-section for convenience. The drive gear 316 which depends from motor 313 is shown. In the cross sectional view of FIG. 4, the toothed segment 307 plate 306 is not readily discernible. However, gear 316 is arranged to pass through an aperture in plate 310 and to engage and mesh with the aforesaid toothed segment.

A rear linkage 341 is pivotably mounted to the bracket 331 by means of a suitable pivot 367. An upper portion of the rear linkage 339 is pivotally mounted to linkage 341 by means of bar 328 as shown in FIG. 3.

A front linkage 340 is mounted to the bracket 331 by a pivot which includes bar 377. The carrier 350 includes the rack gear 326 which is formed as a part of the bracket 338.

When gear 337 is driven by bar 325 and gear 324 (as described hereinafter) the bracket 338 is driven in the forward or backward direction as defined by the channel in carrier 350. Thus, the seat portion will move forward or backward by virtue of bracket 338 being driven along length of the carrier channel.

Thus, the forward and backward motion of the seat is controlled by rack gear 326 and the rotational operation of the seat is controlled by gear 316 in conjunction with cog or tooth portion 307 of plate 306 (see FIGS. 2 and 3).

As seen best in in FIG. 5, each of the gear mechanisms 323, 324 and 327 are substantially the same in configuration and are mounted to a side component 500 which is joined to bracket 331. These gear mechanisms include a respective worm gear 523, 524 and 527. The worm gears are connected to and driven by the respective flexible cables 319, 317, and 318 and the associated motor. A suitable coupling device such as clamp 370 is used to join the flexible cables to the worm gears.

The worm gears are each related to a respective round gear 623, 624 and 627. The round gears are driven by the respective worm gears thereby converting motor shaft operation to gear motion.

In the case of gear mechanism 324, the central shaft or axis of the round gear is connected to (or formed by) shaft 325. The roller gears 337 are connected to shaft 325. Thus, when motor 320 is activated, it drives flexible shaft 317 which, in turn, drives worm gear 524. Worm gear 524 operates to drive round gear 624 which causes shaft 325 to rotate and turn roller gears 337.

In like fashion, motors 322 and 321 cause round gears 623 and 627 to rotate. However, these gears merely rotate around an axle or shaft which is mounted in the seat apparatus. The linkages 339 and 340 are driven in an arcuate path by the round gears 623 and 627, respectively.

The linkages 339 and 340 include toothed cogs or arcuate arms which are driven by the gears round. These cogs or arms are pivotally mounted at the seat mechanism. Thus, as the linkages are moved, the respective seat portions connected thereto also move. If both the front and rear linkages are operated at the same time, the seat moves upwardly in a horizontal plane. If only one of the linkages is operated, the seat tilts front or back.

When motor 313 is operable, the seat selectively rotates 90°. When the seat is facing outwardly, motor 322 can be operated to drive the slider outwardly. Thus, the seat moves outwardly relative to the vehicle. When the rear linkage is activated by motor 320, the seat also tilts forward thereby assisting the occupant to arise and leave the seat.

It is clear that bar 328 includes an offset portion at the center thereof. However, this offset is merely for convenience of assembly and need not be used. As the linkage 339 is moved by the drive gear mechanism 327 (i.e. rotatably driven around pivot 369), the junction with bar 328 moves linkage 341. The linkages 339 and 341 are pivotally mounted to the base 331 and the side portion of the seat which is, therefore, selectively raised. By operating only the rear lift mechanism the seat tends to tilt forwardly thereby selectively urging a person seated on the seat upwardly and outwardly relative to the seat.

In addition, the extender bar 330 is attached across the seat apparatus and extends upwardly therefrom. The extender bar 330 permits the forward tilt of the seat bottom 10A to be enhanced whereby the person using the seat can have better positioning especially on exiting the vehicle.

The angle irons 331, 332 and 333 are attached to the apparatus to provide additional support for the seat bottom portion of the seat apparatus.

In most cases the devices are welded together to provide a rigid and permanent connection. Of course, nuts and bolts, rivets or the like can be utilized, if so desired.

Referring now to FIG. 6, there is shown a control box 600 which houses the control switches for the instant invention. This control box 600 can be a separate unit which is connected to the seat apparatus by means of a cable or, alternatively, it can be mounted on the car door, in a console, in the dashboard or the like. In the embodiment shown, the control box 600 is fabricated of aluminium although plastic is certainly feasible.

The control box 600 includes at least four (4) control switch mechanism 601, 602, 603, and 604. The switch 601 is a slide-type toggle switch which is used to control the height of the seat. That is, the switch controls the up/down operation of the seat when moved in a sliding fashion. Similarly, the switch 603 is another slide-type switch which controls the tilt of the seat when moved as suggested in the Figure. In this embodiment, switch 604 is a pivot, toggle-type switch which controls the rotation of the seat when pivotally moved by the user. Likewise, switch 602 is a pivot, toggle-type switch which controls the front-to-back movement of the seat when moved. In a typical arrangement, the switches actually control the operation of the respective motors 313, 320, 321 and 322 shown in FIG. 3. That is, by placing the switch in one position, e.g. pushed forward, the motor associated therewith is energized and turns clockwise. By pushing the same switch to the back position, the motor is energized and moves in the counter-clockwise direction. When the switch is in the middle, or neutral position, the motor is not activated.

It is clear that other types of switches, such as rotary switches or the like, can be utilized if so desired.

The output cable 605 is connected from the control box 600 to the motors, as noted. The input cable 606 is connected to supply power to the system via the control box 600. The input cable 606 is connected, inter alia, to the battery of the vehicle.

In some vehicles, the power cable is already disposed beneath the seat for use with other power assists such as electrically powered seats of a conventional design. In some instances, this cable includes an interlock system which is used to lock the back of the seat when the vehicle door is closed. By using this interlock system, the seat of the instant invention can be arranged to be disabled and, effectively, inoperative, when the door of the vehicle is closed. Thus, the inadvertent activation of the seat, especially in the rotational mode, is prevented.

Thus, there is shown and described a preferred embodiment of the instant invention. In accordance with the description herein, a seat which enhances the ability of handicapped, disabled or infirm person when entering or leaving a vehicle is provided. The seat provides the conventional power assisted operations such as raising and lowering, moving forward or back. However, this seat apparatus also has the ability to tilt the seat forward thereby to permit the person to leave the seat or enter the seat more conveniently. Likewise, the seat of the instant invention is capable of rotating 90° to assist the person in exiting the vehicle by placing the person, while in the seated position, such that their feet extend outwardly from the vehicle. Conversely, the seat has the advantage of comfortably receiving a person outside the vehicle into the seated position and moving the person into the vehicle while in the seated position.

The mechanism shown and described herein is a preferred embodiment of the instant invention. It is not intended to exhaust all of the variations which may be conceived by those skilled in the art. However, any modifications or variations which fall within the purview of this description are intended to be included therein as well. Thus, the description of the invention is intended to be illustrative only and is not intended to be limitative. Rather, the scope of the invention is limited only by the claims appended hereto.

Having thus described a preferred embodiment of the instant invention,

What is claimed is:

1. A seat apparatus which is movably mounted in a vehicle and comprising, a seat, first means for selectively moving said seat backward and forward, second means for selectively moving said seat rotatably around a vertical pivot whereby said seat can be selectively rotated about said vertical pivot and selectively extended forwardly relative to said vertical pivot, ball bearing means included in said second means to permit ease of rotation of said seat around said vertical pivot, stop means for limiting the rotation of said seat about said vertical pivot, said first means includes a linear toothed component mounted in said seat, said second means includes a circular plate having at least a portion of the circumference forming an arcuate toothed component, said first and second means include first and second motor means, respectively, gear wheel means which interacts with said arcuate toothed component of said circular plate, said gear wheel means mounted to said seat whereby said seat moves around the circular plate when said gear wheel means moves relative to said circular plate, third means for selectively moving said seat upward and downward, linkage means incorporated into said third means, said third means selectively moves only one of a front portion of said seat and a rear portion of said seat, and control means connected with each of said first and second means to control the selective moving of said seat.

* * * * *